United States Patent [19]

Ji

[11] Patent Number: 5,180,040

[45] Date of Patent: Jan. 19, 1993

[54] AUTOMATIC ELECTRIC CARD REWINDING APPARATUS WITH CONTACTS FOR SUPPLYING ELECTRIC POWER

[75] Inventor: Heon Pyeong Ji, Busan, Rep. of Korea

[73] Assignee: Gold Star Co., Ltd., Seoul, Rep. of Korea

[21] Appl. No.: 737,226

[22] Filed: Jul. 29, 1991

[30] Foreign Application Priority Data

Jul. 31, 1990 [KR] Rep. of Korea ............... 11312/1990

[51] Int. Cl.⁵ ............................................. H02G 11/02
[52] U.S. Cl. ............................... 191/12.2 R; 191/12.4
[58] Field of Search ........... 191/12 R, 12.2 R, 12.2 A, 191/12.4

[56] References Cited

U.S. PATENT DOCUMENTS

| | | | |
|---|---|---|---|
| 3,033,488 | 5/1962 | Weber | 191/12.2 R |
| 4,047,599 | 9/1977 | Rousseau | 191/12.2 R X |
| 4,284,180 | 8/1981 | Masters | 191/122 R |
| 4,924,039 | 5/1990 | McAllise et al. | 191/12.2 R |

FOREIGN PATENT DOCUMENTS 8201623  5/1982  Fed. Rep. of Germany ..... 191/12.2 R

*Primary Examiner*—Frank E. Werner
*Assistant Examiner*—Scott L. Lowe
*Attorney, Agent, or Firm*—Fish & Richardson

[57] ABSTRACT

An automatic electric cord rewinding apparatus with contacts for supplying electric power. The apparatus comprises a terminal body, a pair of bow-shaped contact terminals secured to an inner surface of the terminal body by a snap fit and spaced apart from each other, and a winding wheel provided with an opening adapted to receive and support the terminal body, a housing provided with a shaft and inserted into the winding wheel in order to support the winding wheel rotatably. The apparatus also includes an annular body inserted onto the shaft of the housing and divided into two parts by means of a partition member integrally formed with the annular body, and a pair of conduction rings inserted onto the parts of the annular body, respectively, thereby providing the contacts by contacting of said contact terminals with the conduction rings, respectively. The present invention provides an automatic electric cord rewinding apparatus with contacts in which the short between the polar charging parts of the annular body 28, which may occur due to the exchanging of the polar brass powder, can be efficiently prevented as a result of division of the annular body into the two polar parts.

4 Claims, 5 Drawing Sheets

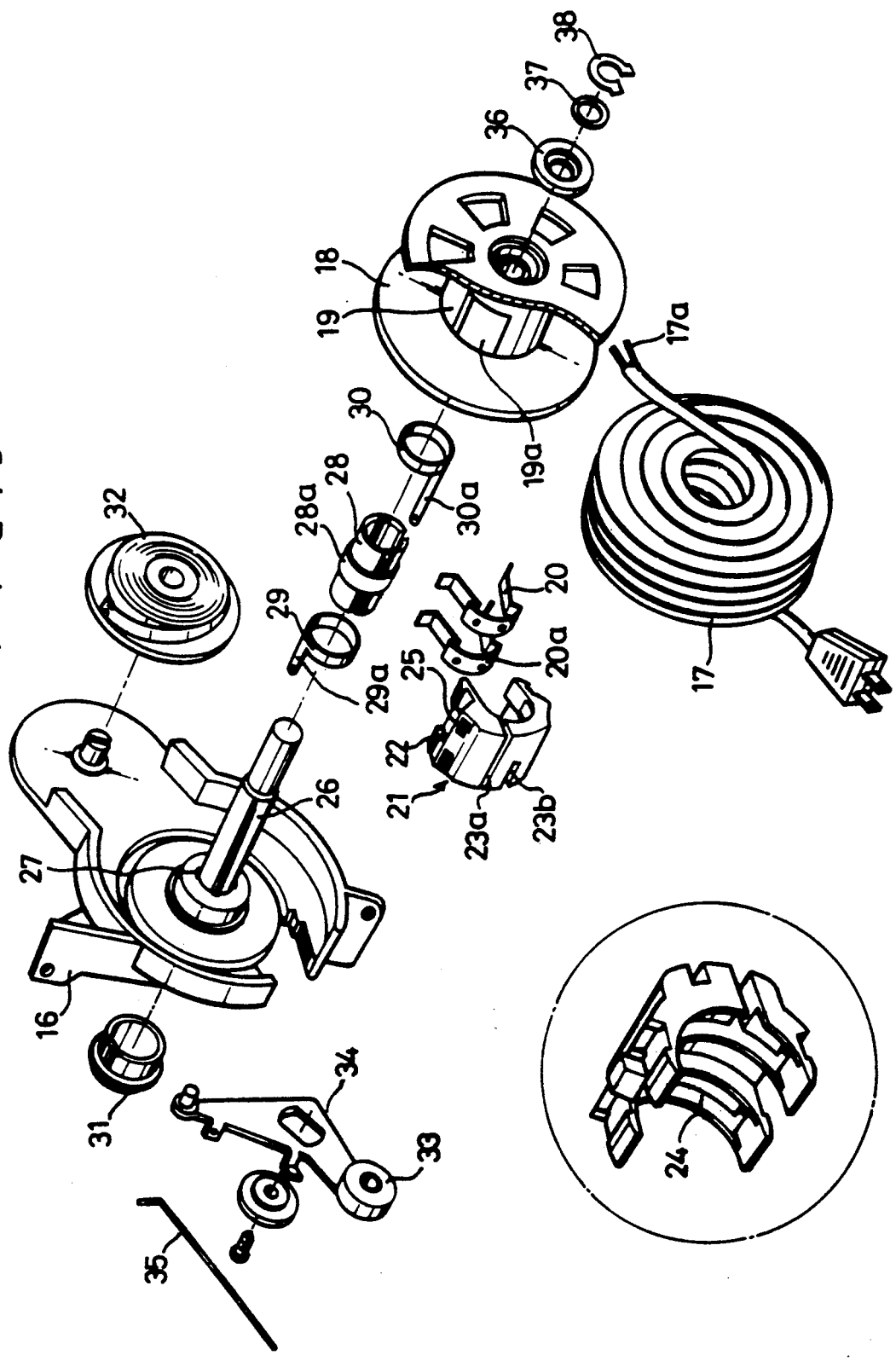

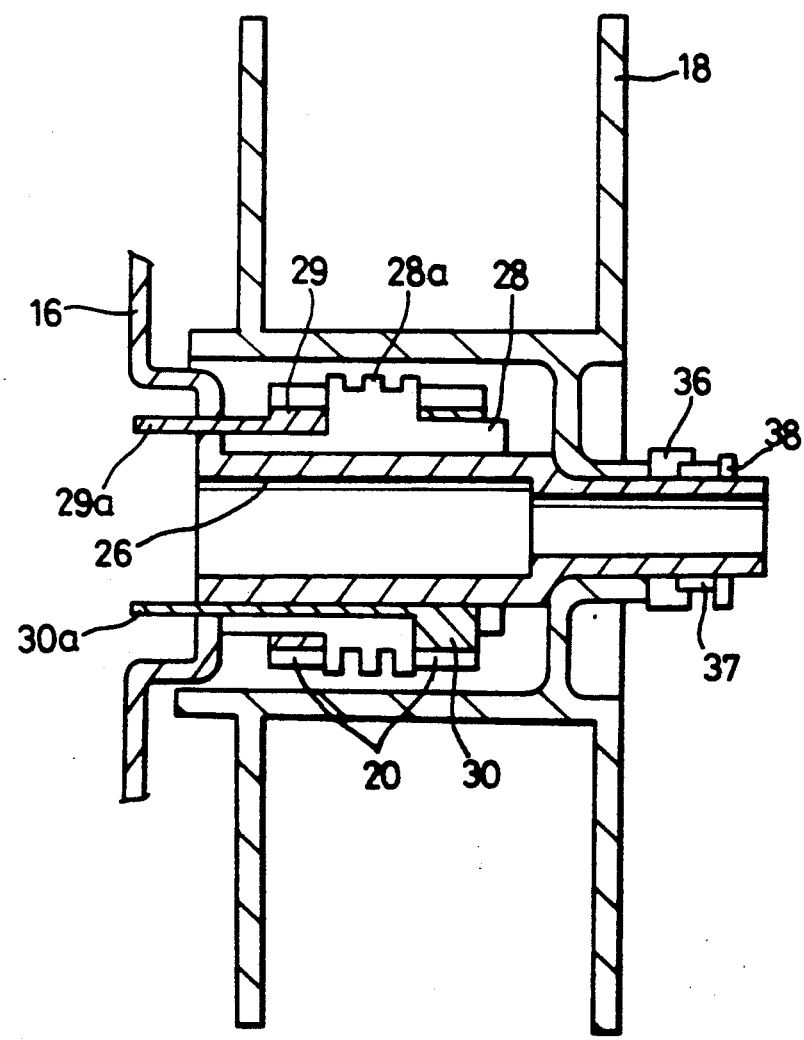

AUTOMATIC ELECTRIC CARD REWINDING APPARATUS WITH CONTACTS FOR SUPPLYING ELECTRIC POWER

BACKGROUND OF THE INVENTION

1. Field of the Invention

The present invention relates to an automatic cord rewinding apparatus for unwinding and unrewinding an electric cord for supplying electric instruments with electric power, and more particularly to an automatic cord rewinding apparatus provided with contacts for connecting the electric power to said electric instruments regardless of the rotation of the winding wheel of the rewinding apparatus.

2. Description of the Prior Art

Conventionally, a known automatic electric cord rewinding apparatus comprises, as shown in FIGS. 1 and 2, a housing 1, a winding wheel 3 on which the electric cord 2 is wound and which is rotatably connected to said housing 1, a coiled torsion spring 4 disposed between said winding wheel 3 and said housing 1 such that the outer end of said spring 4 is connected to the boss of said wheel 3 but the inner end thereof is connected to said housing 1. The spring 4 is adapted for biasing the winding wheel 3, and a spring cover 5 for protecting said cord rewinding apparatus (hereinafter, referred to simply as "the rewinding apparatus") from the outside shock.

Thus, upon removing the pulling force for the cord 2 after having unwound the electric cord 2 from the winding wheel 3, the rewinding apparatus will automatically rewind said cord 2 on the winding wheel 3 by the rotation of said winding wheel 3 caused by the restoring force of the torsion spring 4.

To restrain the abrupt rewinding of the cord, the rewinding apparatus is provided with a stop lever 7 having a rubber ring 6. The stop lever 7 is mounted to the housing 1. Thus, the reversed rotation of the winding wheel 3, caused by the restoring force of the torsion spring 4, is prevented as a result of contact of the rubber ring 6 with the winding wheel 3, thereby accomplishing the prevention of the abrupt rewinding of the cord 2 during the unwinding state of the cord 2.

In addition, the rewinding apparatus has to be provided with contacts through which the outside electric power is connected to the electric instrument to which said rewinding apparatus is provided.

The known rewinding apparatus is, therefore, provided with a cap 8 of an insulation material as shown in FIGS. 1 and 2A. The cap 8 has a pair of annular grooves 8a and 8b in which a conduction ring 9 or 10 is tightly received, respectively. In addition, the winding wheel 3 is provided with a center opening 3a formed at the inner side thereof facing the housing 1. The center opening 3a allows lead wires 2a of the electric cord 2 to extend outwards therethrough, said lead wires 2a connected to a pair of conduction rings 9 and 10 by soldering, respectively. The insulation cap 8 is thereafter mounted to the center opening 3a of the winding wheel 3 in order to accomplish the wheel assembly.

Also, the housing 1 is, as shown in FIGS. 1 and 2B, provided with a pair of spring type terminals 11 and 12 mounted to said housing 1 by means of rivets 13, respectively, said terminals 11 and 12 connected to power supply lead wires (not shown) of the electric instrument, thereby accomplishing the housing assembly.

Thus, upon mounting the outer end of the torsion spring 4 to the boss of the winding wheel 3, the other end thereof to the housing 1 and combining the wheel assembly of FIG. 2A and the housing assembly of FIG. 2B with each other by means of a combining shaft 14, the spring type terminal 11 is naturally connected to the relatively larger diameter conduction ring 9 while the other spring type terminal 12 is naturally connected to the relatively smaller diameter conduction ring 10. Therefore, there is provided contacts at respective connections between the conduction rings 9 and 10 and the spring type terminals 11 and 12 so that the electric power of said conduction rings 9 and 10 is always connected to said spring type terminals 11 and 12 through said contacts. Thus, the outside electric power front the plug 15 is supplied to the electric instrument regardless of the rotation of the winding wheel 3.

However, the known rewinding apparatus has a disadvantage in that the clearance in assembly therefor causes the contact resistance between the conduction rings 9 and 10 and corresponding spring type terminals 11 and 12 to be increased during the rotation of the winding wheel 3 that the contacts overheat. Also, there is another disadvantage in that a short may occur between the polar charging parts of the conduction rings 9 and 10 due to exchange of polar brass powder between said conduction rings 9 and 10, said polar brass powder is produced as a result of the frictional contact between the conduction rings 9 and 10 and the spring type terminals 11 and 12 generated during the rotation of the winding wheel 3 in accompanying with the rotation of the contacts. Furthermore, the rewinding apparatus has still another disadvantage in that it is provided with no means for protecting the lead wires 2a from an outside shock. This results in the movement of said lead wires 2a, so that the leas wires 2a are easily broken from the conduction rings 9 and 10 to which said wires 2a are connected by soldering.

SUMMARY OF THE INVENTION

It is, therefore, an object of the present invention to provide an automatic electric cord rewinding apparatus with contacts in which the above disadvantages can be overcome and which can prevent a short between the polar charging parts of said rewinding apparatus, which may occur due to the exchange of the polar brass powder produced by the frictional contact at the contacts.

The above mentioned object of the present invention can be accomplished by providing an automatic electric cord rewinding apparatus with contacts for supplying electric power comprising a terminal body, a pair of bow-shaped contact terminals snapping at an inner surface of said terminal body and spaced apart from each other, a winding wheel provided with an opening adapted to receive and support said terminal body, a housing provided with a shaft and inserted into said winding wheel in order to support said winding wheel rotatably, an annular body inserted onto said shaft of the housing and divided into two parts by means of a partition member integrally formed with said annular body, and a pair of conduction rings inserted onto said parts of the annular body, respectively, thereby providing said contacts by contacting of said contact terminals with said conduction rings, respectively.

BRIEF DESCRIPTION OF THE DRAWINGS

The above and other objects, features and other advantages of the present invention will be more clearly understood from the following detailed description taken in conjunction with the accompanying drawings, in which:

FIGS. 2A and 2B are views showing assemblies of the rewinding apparatus of FIG. 1 after being assembled, in which:

FIG. 2A is a front view showing a wheel assembly of the rewinding apparatus; and FIG. 2B is a front view showing a housing assembly of the rewinding apparatus;

FIG. 3 is a view corresponding to FIG. 1, but showing the present invention;

FIG. 4 is an elevational sectional view of the rewinding apparatus of FIG. 3 after being assembled;

DETAILED DESCRIPTION OF THE PREFERRED EMBODIMENTS

Figure 1:
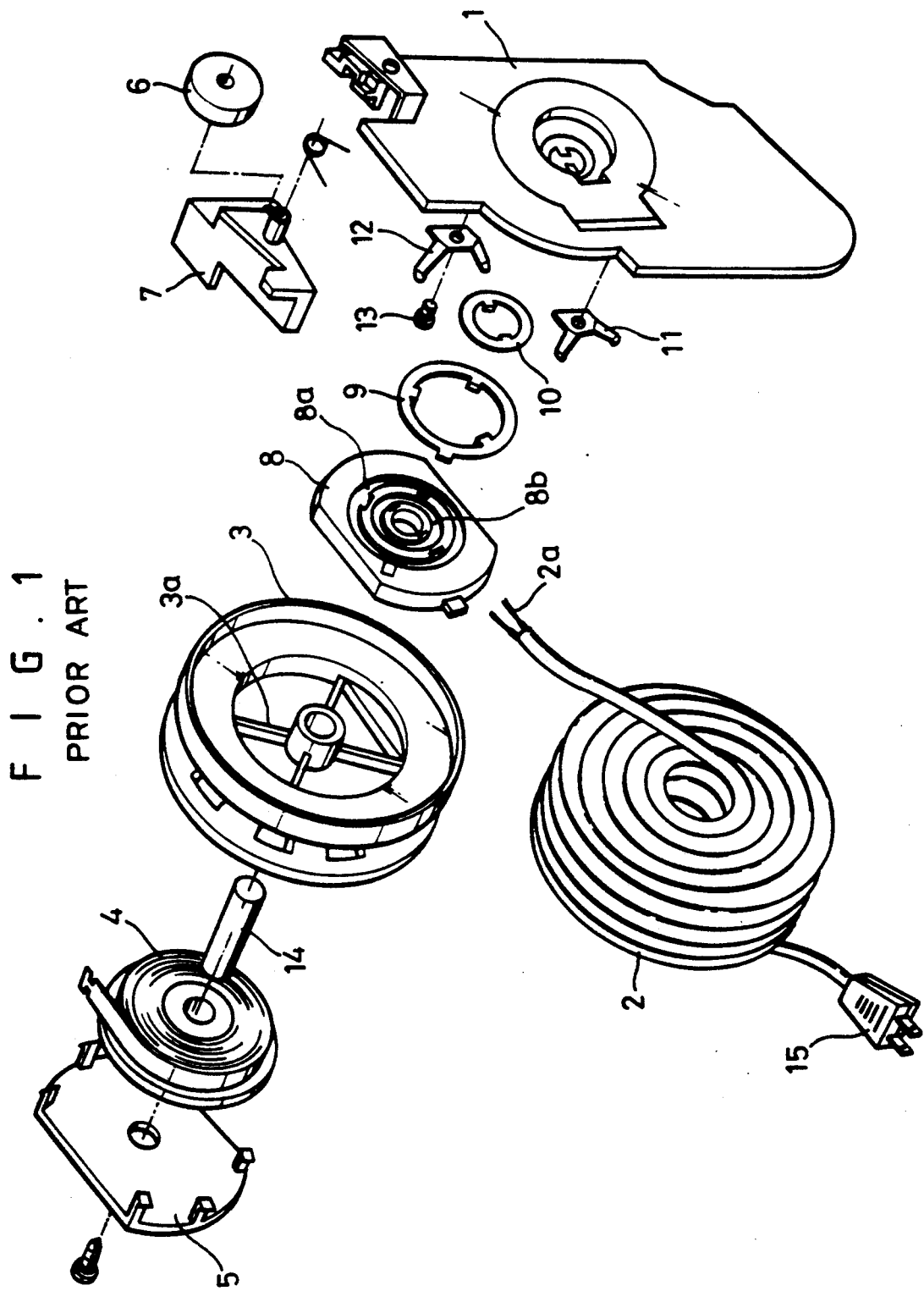
FIG. 1 is an exploded perspective view showing an automatic electric cord rewinding apparatus in accordance with the prior art.
Figure 2A:
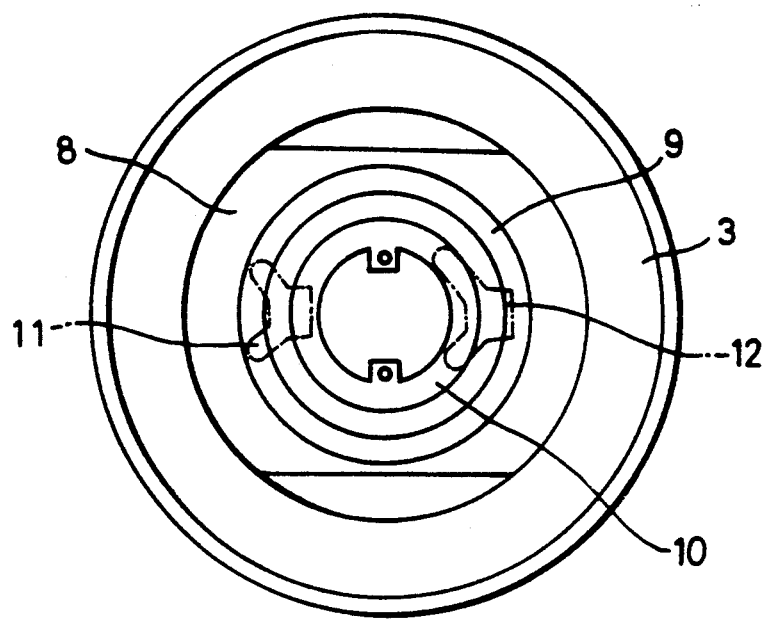
Figure 2B:
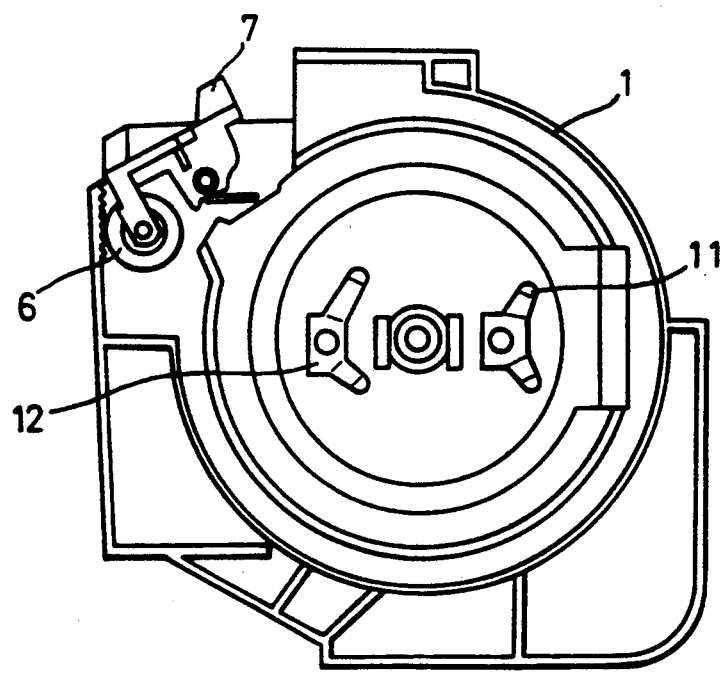
Figure 5A:
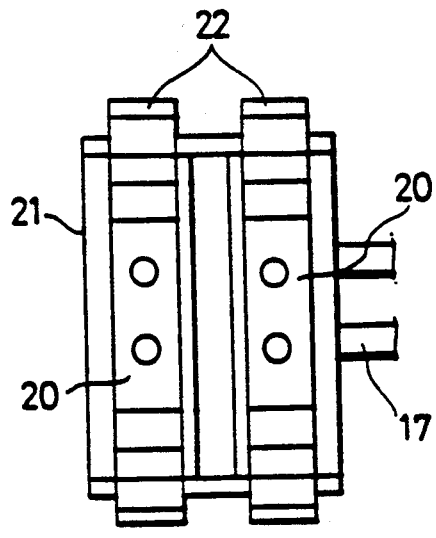
FIGS. 5A and 5B are a front view and a rear view of a terminal body of the rewinding apparatus of FIG. 3, respectively, in each it is shown that contact terminals 20 are attached to the terminal body.
Figure 5B:
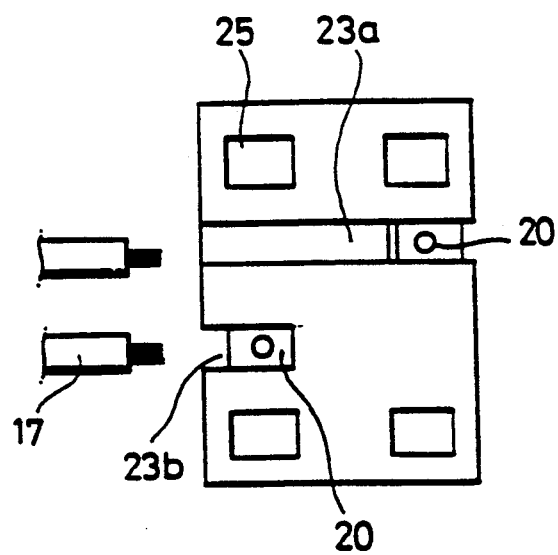
Figure 6:
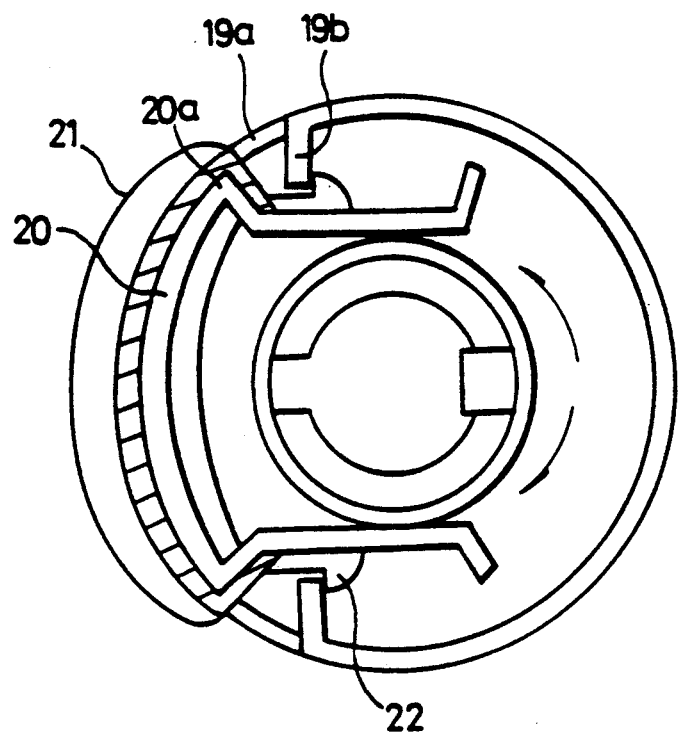
FIG. 6 is a sectional view of the rewinding apparatus of FIG. 3, in which it is shown that the contact terminals, attached to the terminal body, are connected to the conduction rings.

Referring now to FIG. 3 which is an exploded perspective view showing an automatic electric cord rewinding apparatus in accordance with the present invention, the rewinding apparatus comprises a winding wheel 18 and a housing 16 which is inserted into said winding wheel 18. The winding wheel 18 rotates in both directions in order to unwind or rewind an electric cord 17. Also, the winding wheel 18 is provided with an opening 19a formed at a hollow shaft 19 thereof, said opening 19a communicating with the inner space of said hollow shaft 19. Also, a pair of hooking projections 19b (see FIG. 6) are formed to be inwardly extending from the upper and lower ends of the opening 19a of the winding wheel 18, respectively.

On the other hand, the rewinding apparatus is provided with an arc-shaped terminal body 21 and a pair of bow-shaped contact terminals 20, which elements 20 and 21 are connected with each other with a snap and inserted into the opening 19a in order to be supported by the hooking projections 19b. The contact terminals 20 each extends outwardly at upper and lower ends thereof and has a pair of snap projections 20a formed at angulated portions thereof, respectively, while the terminal body 21 extends inwardly at its upper and lower ends and is provided at said ends with upper and lower hooks 22. The hooks 22 adapted for hooking the hooking projections 19b in order to support the terminal body 21, respectively. Also, the terminal body 21 has a pair of grooves, a relatively longer groove 23a and a relatively shorter groove 23b. The grooves 23a and 23b are formed on the outer surface of the terminal body 21, spaced apart from each other and adapted for receiving the separated leads 17a which are to be connected to corresponding contact terminal 20 by soldering. At this time, the width of grooves 23a and 23b is desirably determined such that it is relatively smaller than the diameter of the separated cord. The separated cord is tightly fitted in the grooves 23a and 23b, respectively, so that said separated cord 17 is prevented from being removed from said grooves 23a and 23b. Hence, the short of the connections between the lead wires 17a and the contact terminals 20 can be efficiently prevented.

In addition, the terminal body 21 is provided, at an inner surface thereof, with a pair of vertical depressions 24 which are spaced apart from each other. Also, a pair of rectangular openings 25 are formed at upper and lower ends of each vertical depression 24. The vertical depressions 24 communicate with the grooves 23a and 23b at crosses thereof with said grooves 23a and 23b, thereby allowing the contact terminals 20 to be partially exposed to the outer surface of the terminal body 21 and also the lead wires 17a to be connected to said contact terminals 20 by soldering.

Thus, upon snapping the contact terminals 20 at the vertical depressions 24 of the terminal body 21 after having connected the lead wires 17a of the separated cords to the outer surfaces of said contact terminals 20 by soldering, the snap projections 20a of the contact terminals 20 are inserted with a snap into the rectangular openings 25 of the terminal body 21 so that the contact terminals 20 are tightly attached to the terminal body 21. The separated pieces of the cords are then fitted in the grooves 23a and 23b of the terminal body 21 so as to prevent the movement of cord as described above, and thereby efficiently preventing the short of the connections between the lead wires 17a and the contact terminals 20.

The terminal body 21 with the terminals 20 is thereafter, forcedly inserted into the inner space of the hollow shaft 19 of the winding wheel 18 through the opening 19a formed at said hollow shaft 19 thereof so that the hooks 22 snap at the hooking projections 19b of the hollow shaft 19 of the winding wheel 18, thereby accomplishing the wheel assembly. (see FIG. 6)

Turning again to FIG. 3, the housing 16, supporting the winding wheel 18 rotatably, is provided with a pair of lead holes 27 near a fixed side of a shaft 26 thereof. Also, an annular body 28 is tightly inserted onto the shaft 26. The annular body 28 is provided with an annular rib 28a integrally outwardly extending from the center thereof in order to divide said annular body 28 into two polar parts, but said parts are insulated from each other by the annular rib 28a. The divided polar parts of the annular body 28 are tightly connected to a pair of conduction rings 29 and 30 inserted onto said parts, respectively. Also, the conduction rings 29 and 30 have a relatively shorter connecting pin 29a and a relatively longer connecting pin 30a integrally formed therewith, respectively. The relatively longer connecting pin 30a extends radially inwardly from the ring 30 and then axially extends at an angulated step, so that said pin 30a axially penetrates the annular body 28. Thus, the connecting pins 29a and 30a are efficiently restrained from being connected to each other as the conduction rings 29 and 30 are mounted to the annular body 28.

Thereafter, the annular body 28 with the conduction rings 29 and 30 is inserted onto the shaft 26 of the housing 16 such that the free ends of the connecting pins 29a and 30a penetrate the lead holes 27 of the housing 16, respectively. Then, the free ends of the connecting pins 29a and 30a, fully penetrating the lead holes 27, are connected to lead wires (not shown) which is connected to the electric instrument by soldering. Also, a cap 31 is mounted to the outer side of the housing 16 opposite to the shaft 26 in order to cover and protect the soldering connections. On the other hand, a coiled torsion spring 32 is disposed at the inner side of the housing 16 such that the inner end thereof is connected to said housing 16. The torsion spring 32 is also connected to the boss of the winding wheel 18 at the outer end thereof, thereby accomplishing the housing assembly.

Additionally, a stop lever 34, provided with a rubber ring 33 at an end thereof, is mounted to the outer side of the housing 16 by means of a set screw, while a torsion spring 35 is provided to the stop lever 34 in order to bias said stop lever 34. The winding wheel 18 is then inserted onto the shaft 26 of the housing 16 after having connected the outer end of coiled torsion spring 32 to the boss of the winding wheel 18. As shown in FIG. 4, the housing 16 is thus tightly combined with the winding wheel 18 by means of a cord cover 36, a washer 37 and a C-ring 38 successively inserted onto the free end of the shaft 26 of the housing 16. At this time, the contact terminals 20 naturally connect to the conduction rings 29 and 30, respectively, thereby accomplishing the assemblage of the rewinding apparatus of this invention.

In this assembled state, upon pulling the cable cord 17 wounded on the winding wheel 18, the cord 17 is unwound from the wheel 18 simultaneously with loosening the coiled torsion spring 32 interposed between the housing 16 and the boss of the winding wheel 18. At this time, the stop lever 34 is upwardly biasing by virtue of the unwinding force of the cord 17 so as to allow the cord 17 to be smoothly unwound from the winding wheel 18. At the same time, the contact terminals 20, tightly snapping at the terminal body 21 and partially exposed to the outer surface of the terminal body 21 by virtue of the communicating holes of said terminal body 21, always rotates simultaneously with contacting to the conduction rings 20 elastically at upper and lower ends thereof, respectively, thereby allowing the outside electric power to be always supplied to the electric instruments through the contacts provided by said contact terminals 20 and said conduction rings 29 and 30.

In this rewinding apparatus, the brass powder produced by the frictional contact between the contact terminals 20 and the conduction rings 29 and 30 during the rotation of the winding wheel 18 is prevented by virtue of the annular rib 28a from being exchanged between the polar parts of the annular body 28. Thus, the rewinding apparatus of this invention provides advantage in that the short between the polar charging parts of the annular body 28, which may occur due to the exchanging of the polar brass powder, can be efficiently prevented as a result of division of the annular body into the two polar parts.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An automatic electric cord reel rewinding apparatus with contacts for supplying electric power comprising:
   a terminal body having a pair of vertical depressions at an inner surface spaced apart from each other and a pair of grooves at an outer surface, each said vertical depression including a pair of openings at both ends;
   a pair of bow-shaped contact terminals having a pair of snap projections at both ends of an angulated part of said contact terminal and being secured in said vertical depressions of the terminal body respectively, said snap projections being secured into said openings of said vertical depressions by a snap type fit, lead wires of an electric cord being connected to said bow-shaped contact terminals via said grooves;
   a winding wheel provided with an opening adapted to receive and support said terminal body;
   a housing provided with a shaft inserted into said winding wheel in order to rotatably support said winding wheel;
   an annular body inserted onto said shaft of the housing and divided into two parts by means of an annular rib integrally formed with said annular body; and
   a pair of conduction rings inserted onto said parts of the annular body, respectively, whereby said bow-shaped contact terminals each contact one of sad conduction rings.

2. An automatic electric cord reel rewinding apparatus with contacts for supplying electric power according to claim 1, where one of said grooves is relatively shorter than the other.

3. An automatic electric cord reel rewinding apparatus with contacts for supplying electric power according to claim 1, wherein said annular rib extends outwardly from the center of said annular body.

4. An automatic electric cord reel rewinding apparatus with contacts for supplying electric power according to claim 1, wherein each of said bow-shaped contact terminals has a hole in the angulated part into which a strand of a wire is adapted to be inserted, whereby the strand can then be soldered on an outer surface of the angulated part of the bow-shaped contact terminal.

* * * * *